UNITED STATES PATENT OFFICE.

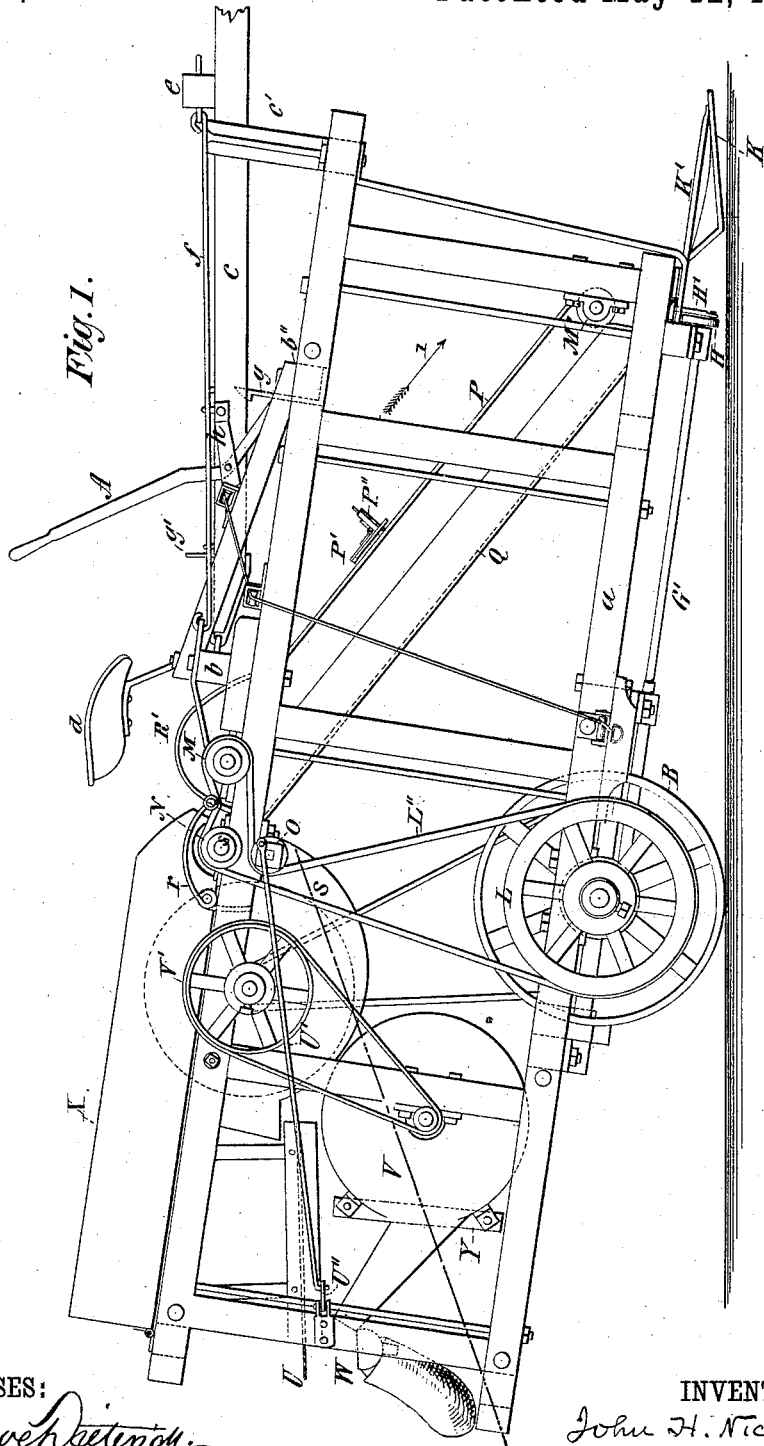

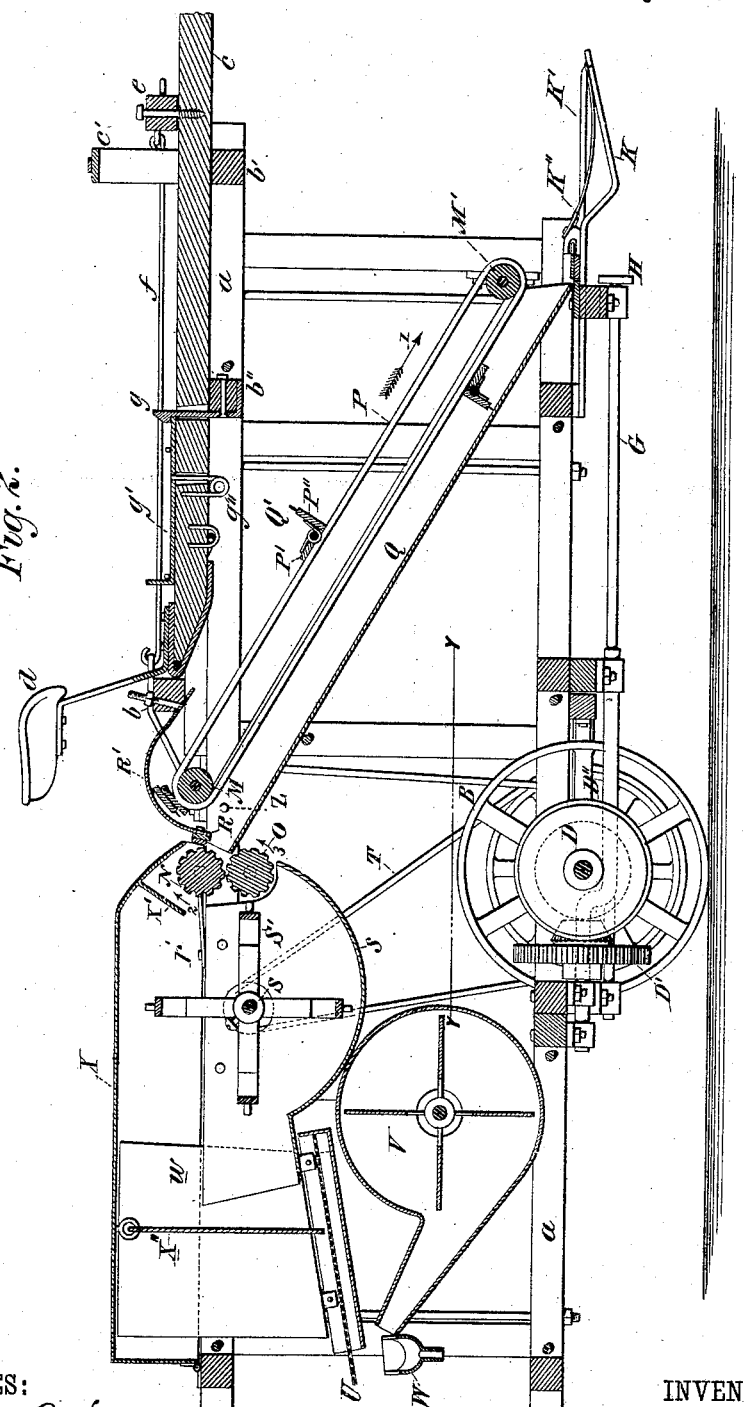

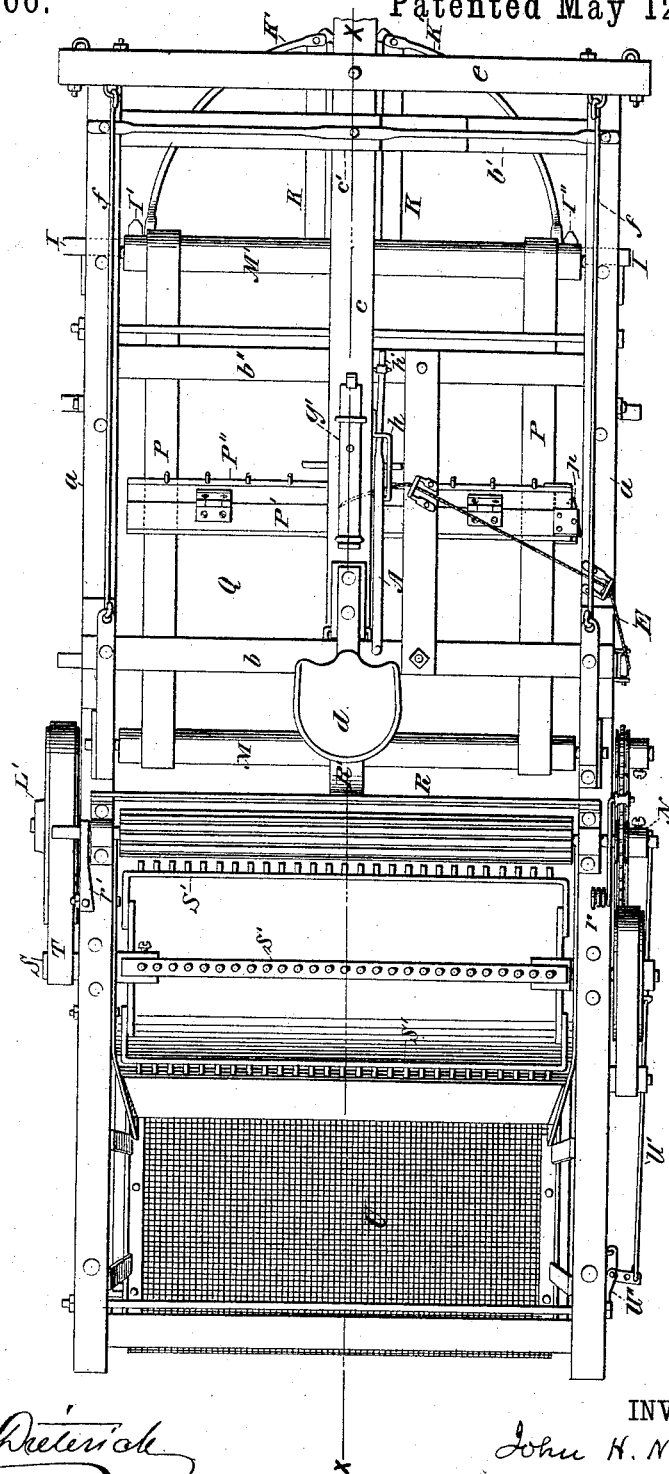

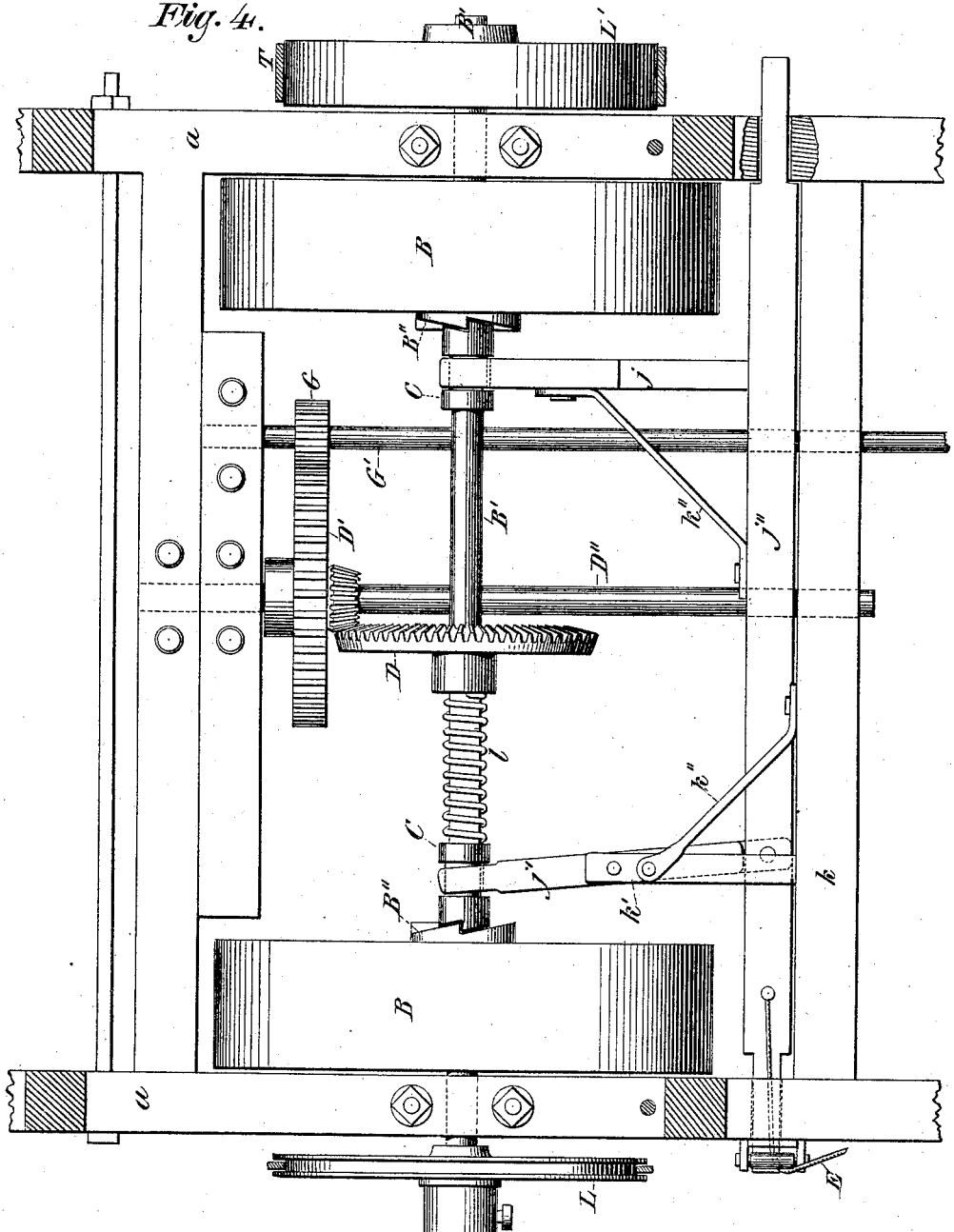

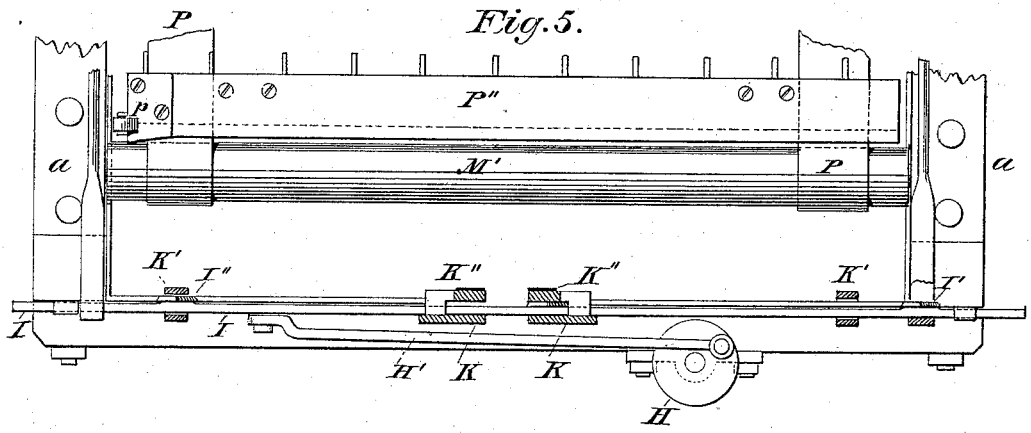

JOHN H. NICHOLES, OF SUMTER, ASSIGNOR OF ONE-HALF TO AUGUSTINE T. SMYTHE, OF CHARLESTON, SOUTH CAROLINA.

PEA-HARVESTING MACHINE.

SPECIFICATION forming part of Letters Patent No. 317,666, dated May 12, 1885.

Application filed May 12, 1884. (No model.)

*To all whom it may concern:*

Be it known that I, JOHN H. NICHOLES, of Sumter, county of Sumter, and State of South Carolina, have invented a new and useful Improvement in Pea Harvesters and Mowers, of which the following is a specification.

The invention relates to a machine for harvesting peas from the vines; and it consists in the construction and arrangement of mechanism more particularly hereinafter set forth.

The machine is designed to straddle a row of vines, and be drawn by horses moving in the alleys on each side of the row. On the front end of the machine are arranged bars so bent and curved as to raise the vines from the ground and bring the stems to the reciprocating knife-bar. As the vines are cut they are seized by rakes attached to endless bands which carry them up an inclined platform and deliver them between feed-rollers.

If the machine is used simply as a mower, the feed-rollers deliver the vines upon a downwardly-inclined platform, from which they are discharged in rear of the machine. If, however, the apparatus as it is here shown is used as a harvester, then the feed-rollers take the vines from the gathering-rakes into a thrasher. After passing through the latter, the peas, chaff, &c., are delivered upon a vibrating sieve where they are subjected to the blast of a fan-blower. The chaff is driven out in rear of the machine, and the peas fall from the sieve into a trough, by which they are conducted to bags arranged to receive them. The operation of the apparatus is therefore continuous as it advances.

In the accompanying drawings, Figure 1 is a side elevation. Fig. 2 is a longitudinal section on the line $x$ $x$, Fig. 3. Fig. 3 is a plan view, and Fig. 4 is a partial plan view, showing details on the line $y$ $y$ of Fig. 2. Fig. 5 is a detail view of the cutting mechanism.

Similar letters of reference indicate like parts.

The body or frame-work of the machine consists of two side frames, $a$, united by transverse bars or cross-beams. To the cross-beam $b$ on the upper side of the frame, the tongue $c$ is connected by strap and staple. The driver's seat $d$ is supported upon the tongue by a standard, as shown. Draft is applied to single-trees connected to the ends of the double tree $e$, which is bolted across the tongue, and having brace-rods $f$ extending rearwardly and connected to straps bolted to cross-beam $b$ and to the main frame. Upon the upper front cross-beam, $b'$, is secured a guide, $c'$, through which passes the tongue $c$. Secured to the rear side of the upper cross beam, $b''$, is a catch, $g$. In the tongue $c$ is a slot upwardly through which the catch $g$ passes. On the upper side of the tongue is a slide, $g'$. This slide is confined by straps, as shown in Fig. 3, and has an upwardly-bent rear end. A bent spring, $g''$, passes up through the tongue and is secured therein and tends to throw the slide $g'$ forward. Pivoted between a bent bar, $h$, and the side of the tongue is a lever, A. The lower end of this lever engages in a staple, $h'$, in the cross-beam $b''$.

When the driver is in his seat, he may conveniently move with his foot the rear upwardly-bent end of the slide $g'$ to draw the same backward. Said slide is thus disengaged from the catch $g$, and the front end of the main frame of the apparatus is thus free to descend. The machine is then in working position, as shown in Fig. 1. When it is desired to raise the front end of the machine, the driver pulls the lever A backward. The front end then rises and the catch $g'$ moves upward through the slot in the tongue until the shoulder of the hook comes sufficiently above said slot to enable the slide $g'$ to be thrown into engagement by the action of the spring $g''$. By the above means, therefore, the front end of the machine may be raised or lowered, and thus the cutting-blades disposed thereon be thrown out of or into operation.

I will next describe the driving-gear, which is best shown in Fig. 4. The wheels B support the machine. They are loose upon their axle B'. Upon the inner sides of the hubs of the wheels B are ratchet-teeth B'', adapted to engage with the similar teeth of the clutches C. The clutches C slide upon the axle B', and are provided with internal grooves, to receive feathers formed upon said axle. When the clutches C are in engagement with the hub-ratchets B'', the revolution of the wheels B turns the axle B'. The clutches C are provided with grooves to receive the forked ends of the bars j' and j. The bar j projects from and is rigidly secured to a laterally-movable cross-bar, j'''. The bar j' has its inner end pivoted to the movable bar j''', and is also pivoted at or near its middle to a rigid bar, k', which is secured to the cross-beam k. Braces k'' extend from the bar j to the movable cross-bar j''' and from the bar j' to the cross-beam k.

By reason of the arrangement of the clutches C their moving bars j j' and the laterally-movable bar j''', it will be apparent that when the bar j''' is moved laterally the clutches C move upon the axle in relatively opposite directions, so that both clutches C enter into engagement or disengagement with the hub-ratchets B'' simultaneously. The clutches C are normally held in engagement with the hub-ratchets B' by means of the spiral spring l, which surrounds the axle B'. One end of this spring bears against the collar of a gear-wheel, D, which is fast upon the axle B'. Its opposite end bears against one of the clutches C. By moving that clutch outwardly, however, the spring vibrates the pivoted bar j' to throw the laterally-movable bar j''' in the opposite direction, so as to cause it to move the bar j, and so bring the outer clutch, C, into engagement. Thus both clutches C are thrown into action by the spiral spring l. The clutches C are disengaged from the hub-ratchets B'' by moving the bar j''' by means of the cord or chain E attached thereto. This cord passes over three pulleys, as shown in Fig. 1, and is fastened under the tongue c, below the lever A. When the front end of the machine is elevated, the cord or chain E is at the same time, and by reason of the upward movement of said front end, pulled, thus moving the bar j''', and so disengaging the clutches. When the front end of the machine is lowered, the cord or chain E is slackened and the rotation of the wheels B is communicated through the clutches C to the axle B', and thence to the working parts of the apparatus.

From what has thus far been described it will be obvious, first, that, by lowering or raising the front end of the machine in the manner set forth, the cutting mechanism will be brought into or out of operation; second, that, by reason of said lowering or raising, the clutches between the driving-wheels and driven mechanism are caused to engage or disengage.

I will now describe the mechanism for cutting the vines and its mode of operation.

The gear-wheel D engages with a bevel-pinion which rotates the gear D' on the short shaft D'', Fig. 4. The gear D' communicates its motion to a pinion, G, upon the shaft G'. The shaft G' extends forward to the front of the machine, and is supported in suitable bearings on the lower cross-beams. On the end of said shaft is a disk, H, to which is eccentrically pivoted a rod, H', Fig. 5. Said rod at its other end is pivoted to the knife-bar I, Figs. 3 and 5. This bar is arranged to reciprocate laterally in its supports, and has three knives, two of which, I' and I'', (shown in Fig. 3,) are at the ends, and one, J, Fig. 5, is at the middle. Projecting in front of the machine are two bent metal bars, K. From the ends of these bars curved rods K' extend nearly to the sides of the machine, these rods K' being connected to the lower front cross-beam. Braces K'' extend across the angles formed by bending the bars K. The knives on the knife-bar I are so disposed that the central knife, J, works laterally between the bars K, and the end knives, I' and I'', reciprocate between the points of attachment of the rods K' and the lower longitudinal beams of the main frame.

Motion is communicated from the axle B' through the gearing and shafts described to the knife-bar, which thus reciprocates laterally as the machine advances. The machine straddles the row of vines, the horses, hitched to each end of the double-tree e, walking in the alleys. The stems of the vines enter between the front projecting bars, K, and are thus lifted from the ground and guided to the central knife. Vines outside the row meet the curved bars K', and by them are guided to the end knives. The vines thus cut are taken by the gathering-rakes, the mechanism and mode of operation of which I will next explain. At each end of the axle B' and outside the frame of the machine are secured chain-wheels L and L', Fig. 4. Around the wheel L passes a chain belt, L'', which also passes over sprocket-wheels on the rollers M, N, and O, consequently communicating motion to all three of said rollers. Journaled in the front uprights of the main frame, near their lower ends, is a roller, M'. Between the rollers M and M', and passing over sprocket-wheels upon them, extend two belts, P, preferably of chain having flat links. Beneath the belts P is the inclined platform Q.

The gathering-rakes, which take the vines from the cutting mechanism, may be any desired number. Only one is shown in Fig. 3 for the sake of clearness, and the different positions of this rake are represented in Fig. 2. Between the chain-belts P extends a bar, P', Fig. 6, riveted or otherwise secured to said belts. Hinged to the bar P' is the rake-bar P'', which is provided with teeth, as shown.

The particular construction and arrangement of the rake set forth I do not claim herein, as the same is the subject-matter of another application for Letters Patent to be filed.

Referring now more particularly to Fig. 2, the movement of the belts P when the machine advances is in the direction of the arrow 1. The vines cut by the knives enter between the belts P and the platform Q. The rake-teeth project downward from the belts P and the vines caught thereby are moved up the apron. When the rake nearly reaches the upper roller, M, one end of the pivoted latch p meets a projection or stop, which is shown in the drawings, Fig. 2, at Z, and which may be secured in any convenient way to the frame, so as to project inward just below the roller M, and in suitable position to have the latch $p$ meet it, as described. The rake-bar $p''$ is now free to fold upon the bar P. This is effected by the rake-bar P''' meeting a fixed cross-bar, R, which at the same time clears the rake-teeth of the vines caught therein. After leaving the bar R the rake-bar is prevented from opening again at right angles to the bar P' by the curved bar R', which holds the bar P'' folded against the bar P', as shown in Fig. 2, until after the rake has moved over the roller M, when the bar P'' is moved outward by the spring. The rakes thus gather the vines as they are cut by the knives and carry them up the apron. Their speed should be a little greater than that of the forward movement of the machine, so that a pulling strain is caused upon the vines and clogging is prevented. The chain belt L'', which drives the rollers M, N, and O, is provided with a spring-tightener, $r$, which bears upon the part of the belt between the rollers M and N.

After the vines have been cut and gathered in the manner set forth they are thrashed, and the mechanism for this purpose I will now describe.

The rollers N and O are driven by the belt L'' in opposite directions, as indicated by the arrows 2 and 3 in Fig. 2. The peripheries of these rollers are corrugated or roughened longitudinally, so that they grasp the vines between them as said vines are delivered by the rakes and move the vines into the thrasher. The journals of the roller N are arranged to have considerable vertical play in their bearings. Said journals are held down in place by the belt L'' on one side and a spring, $r'$, on the other side, one end of said spring pressing down upon the roller-shaft. By this construction the upper roller, M, will yield when the vines are rank and unduly large quantities of them are delivered by the rakes.

The thrasher consists of a case, $s$, having a curved bottom. Through said case, and journaled in bearings in the frame of the machine, passes a shaft, S. Within the case the shaft carries beating or thrashing frames S', provided with teeth, as shown. At one end of the shaft may be a chain-wheel, which communicates by a belt, T, preferably of chain, with the pulley L', fast on the end of the axle B'. Motion is thus communicated from the axle B' to the thrasher, into which the vines are delivered by the rollers N and O.

The beaters of the thrashing apparatus throw out the material upon a sieve, U, which is suspended by any suitable means in a slightly-inclined position from the main frame. This sieve is given a shaking motion in the following manner: Eccentrically pivoted to the end or to a disk on the end of the shaft of the roller O is a rod, U', which is connected to one arm of a bell-crank lever, U'', which is pivoted to the frame. The other arm of this bell-crank lever is connected to the sieve. The rotation of the roller-shaft reciprocates the rod U', which, through the bell-crank, vibrates the sieve.

Beneath the sieve U is arranged a fan-blower, V, of the usual construction, the fan-shaft being driven by belting from a pulley, V' on the end of the thrasher-shaft. The fan blows the chaff falling through the sieve out at the rear of the machine. The peas fall from the sieve into a transverse trough, W, and thence may pass to a bag attached to a spout on said trough.

X is a lid which covers and protects the machinery beneath and keeps the grain from scattering. On each side of said lid are downwardly-projecting partitions $w$, to keep the vines and grain from falling over the sides of the sieve. X is a swinging partition suspended from the lid to keep the grain from being thrown out beind by the thrasher. X' is an inclined fixed partition for directing the vines from the rollers N and O beneath the beaters of the thrasher. The lid is hinged on its rear side to the frame, so that it may be conveniently lifted to afford access to the mechanism. Y, Fig. 1, is a clamp for holding the fan-case in place.

In order to convert the machine from a harvester into a mower the thrasher, sieve, and fan may be removed and an inclined plane or platform substituted, extending, as shown by dotted lines, Fig. 1, from beneath the roller O to the rear lower cross-beam, the upper end of said platform being supported in any convenient way from the frame of the machine. The vines after leaving the rakes then pass through the rollers O and N to the rear inclined platform, and thence to the ground.

I claim as my invention—

1. The combination of the supporting-wheels and an axle or shaft rotated thereby, a laterally-reciprocating knife-bar carrying knives for cutting the vines, actuated by gearing from said axle or shaft, an upwardly-inclined platform in rear of said cutting mechanism, an endless belt or belts passing over rollers or shafts supported immediately over said platform, one of said rollers being rotated by intermediate mechanism communicating with the driving-shaft, a rake or rakes transversely supported upon said belt or belts and projecting downward from said belt or belts to engage the vines and draw them upward over and upon the inclined platform, and delivery-rolls, also actuated from the driving-shaft and arranged at the upper end of the platform, to receive between them the vines after the latter have been elevated by the rakes and to deliver said vines in rear of the machine, substantially as described.

2. The combination of the supporting-wheels and an axle or shaft rotated thereby, a laterally-reciprocating knife-bar carrying knives for cutting the vines, an upwardly-inclined platform in rear of said cutting mechanism, an endless belt or belts passing over rollers or shafts supported immediately over said platform, a rake or rakes transversely supported upon said belt or belts and projecting downward from said belt or belts to engage the vines and draw them upward over and upon the inclined platform, delivery-rollers arranged at the upper end of said platform to receive between them the vines elevated by the rakes, a rotary thrasher disposed in rear of said rollers receiving the vines therefrom, a suspended vibrating sieve arranged below and in rear of the thrasher-outlet, and a rotary blower arranged below said sieve and delivering its blast beneath the same, the said parts being supported in the frame of the machine and actuated by suitable interposed gearing transmitting motion from the axle, substantially as described.

3. The combination of the driving-wheels and an axle or shaft rotated thereby, a rotary thrasher actuated by intermediate mechanism for said shaft, rollers receiving the gathered vines between them and delivering said vines into said thrasher, also actuated by intermediate mechanism from said driving-shaft, a suspended vibrating sieve arranged in rear and below the thrasher-outlet, the said sieve being vibrated by mechanism communicating with one of said delivery-rollers and receiving motion therefrom, and a rotary blower arranged below said sieve and delivering its blast at and below the rear end thereof, and receiving motion by intermediate gearing from the thrasher-shaft, substantially as described.

4. The combination of the frame or body supported upon wheels on a single axle, so that the forward portion of the machine shall overbalance the rear portion, a tongue, c, hinged or otherwise loosely secured at its rear end upon and extending forwardly over said frame or body, a catch, g, upon said frame adapted to enter a slot in the tongue c, a sliding bar, g', secured on the upper side of the tongue c and adapted to engage with the catch g, and a spring, g'', acting upon said bar g', substantially as described.

5. The combination of the frame or body supported upon wheels on a single axle, so that the forward portion of the machine shall overbalance the rear portion, a tongue, c, hinged or otherwise loosely secured at its rear end upon and extending forwardly over said frame or body, a detachable connecting device between said tongue and the forward portion of said body, whereby the said portion may be supported from the tongue and prevented from resting upon the ground, and a driver's seat supported upon and over said tongue, substantially as described.

6. The combination of the frame or body supported by wheels on a single axle, so that the forward portion of the machine shall overbalance the rear portion, a tongue, c, hinged or otherwise loosely secured at its rear end upon and extending forwardly over said frame or body, a catch, g, upon said frame adapted to enter a slot in the tongue c, and a sliding bar, g', secured on the upper side of the tongue c and adapted to engage with the catch g, substantially as described.

7. The combination of the frame or body supported upon wheels on a single axle, so that the forward portion of the machine shall overbalance the rear portion, a tongue, c, hinged or otherwise loosely secured at its rear end upon and extending forwardly over said frame or body, and a lever, A, pivoted upon said tongue and engaging with the frame or body, substantially as described.

8. The driving-wheels loose upon their axle, a clutch mechanism arranged upon said axle and interposed between the same and the driving-wheels, a means of keeping said clutches normally in engagement with the driving-wheels, mechanism adapted to move said clutch device out of engagement with the said wheels, and a cord or other flexible connection attached at one end to said disengaging mechanism and adapted to move the same, in combination with the frame or body of the machine supported on said axle so that the forward portion of said body shall overbalance the rear body, and a tongue hinged or pivoted at its rear end to and extending forwardly over said body, the said cord being attached to said tongue at its free end and made of such a length that it shall draw and hold the clutch mechanism out of engagement with the driving-wheels, as and when the forward portion of the body is elevated from the ground, and by reason of the elevation of said forward body, substantially as described.

9. The combination of the frame or body of the machine, the driving-wheels B, axle B', clutches C B'', spring l, bar j''', bar j, bar j', bar k', cord E, and tongue c, the said cord being connected at one end to the bar j'' and at the other end to the tongue c, substantially as described.

10. The combination of the driving-wheels B, axle B', rotated thereby, pulley L, belt L'', belt-roller M, and feeding-rollers N and O, substantially as described.

11. The combination of the knife-bar I, carrying the knives I', I'', and J, the forwardly-projecting bars K, bars K'', curved bars K', connecting-rod H', disk H, shaft G', driving-wheels B', and intermediate mechanism for transmitting motion from said wheels to the shaft G', the said parts being supported by the frame of the machine, substantially as described.

12. The combination of the driving-wheels B, axle B', clutches C B'', spring l, bar j''', fixed bar j, pivoted bar j', and bar k', rigidly supported on the frame of the machine, substantially as described.

13. The combination of the driving-wheels B, the axle B', rotated thereby, pulley L, belt L'', the feed-roller N, elongated bearings for said roller wherein it has vertical play, rollers O and P, belt-tightener r, and presserspring $r'$, the said tightener and spring pressing said roller N down in its bearings and resisting its upward movement, substantially as described.

14. The combination of the driving-wheels B, axle B′, rotated thereby, pulley L, belt L″, feed-rollers N O, thrasher $s$ S′ S, pulley L′, and belt T, communicating motion to the thrasher-shaft, substantially as described.

15. The combination of the driving-wheels B, axle B′, rotated thereby, pulley L, belt L″, roller O, rod U′, bell-crank U″, sieve U, pulley L′, belt T, thrasher-shaft S, pulley V′ thereon, blower V, and belt-connection between pulley V′ and blower-shaft, substantially as described.

16. The combination, with the frame of the machine and the thrasher $s$ S S′, and vibrating sieve U, of the hinged lid or cover X, supporting the fixed partitions X′ and $w$, and the swinging partition X″, substantially as described.

JOHN H. NICHOLES.

Witnesses:
W. F. B. HAYNSWORTH,
T. B. FRASER, Jr.